US012063496B2

(12) United States Patent
Shin et al.

(10) Patent No.: US 12,063,496 B2
(45) Date of Patent: Aug. 13, 2024

(54) SPATIAL AUDIO GUIDED BY ULTRA WIDEBAND USER LOCALIZATION

(71) Applicant: Google LLC, Mountain View, CA (US)

(72) Inventors: Dongeek Shin, San Jose, CA (US); Jian Guo, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 219 days.

(21) Appl. No.: 17/702,472

(22) Filed: Mar. 23, 2022

(65) Prior Publication Data

US 2023/0308827 A1 Sep. 28, 2023

(51) Int. Cl.
*H04S 7/00* (2006.01)
*H04R 5/02* (2006.01)

(52) U.S. Cl.
CPC ............... *H04S 7/303* (2013.01); *H04R 5/02* (2013.01); *H04S 2400/11* (2013.01)

(58) Field of Classification Search
CPC ........ H04R 5/02; H04S 7/303; H04S 2400/11
See application file for complete search history.

(56) References Cited

U.S. PATENT DOCUMENTS 10,506,361 B1 * 12/2019 Pallamsetty ............. H04R 5/02
2013/0294618 A1 11/2013 Lyubachev
2015/0208188 A1 7/2015 Carlsson et al.
2016/0105754 A1 4/2016 Carlsson et al.
2021/0136509 A1 5/2021 Harris et al.
2021/0306784 A1 * 9/2021 Li ............................ H04B 1/04

FOREIGN PATENT DOCUMENTS

EP 2952925 A1 12/2015
KR 2009029424 A * 3/2009
KR 101103361 B1 1/2012
KR 101371806 B1 3/2014

* cited by examiner

*Primary Examiner* — Sunita Joshi
(74) *Attorney, Agent, or Firm* — Colby Nipper PLLC

(57) ABSTRACT

The present disclosure provides a mechanism to synchronously drive distributed speakers around a user based on localization outputs of ultra wideband (UWB) communication chips already existing in devices. Distances may be determined between a user device, such as a phone or wearable, and a plurality of distributed speakers or other devices. Based on an intersection point of such distances, the user's location can be identified. Such location can be used to modify how audio is played on each of the plurality of distributed speakers.

20 Claims, 8 Drawing Sheets

Proximity equalization

Uniform equalization

SPATIAL AUDIO GUIDED BY ULTRA WIDEBAND USER LOCALIZATION

BACKGROUND

Surround sound systems typically consist of several speakers distributed around a room. For example, in a living room in a home, speakers may be placed near a television and behind or near seating areas, such that viewers of the television can experience an immersive sound. Such systems are typically expensive and difficult to install.

Distributed audio systems can also be created using other types of audio devices, such as positioning several mobile phones around a room. However, there is not a clear way for the distributed audio system to understand where the user is at a fine-scale resolution. Use of a global positioning system (GPS) is a common technique for identifying a user's absolute position, but it does not operate well indoors and cannot provide accurate indoor location.

BRIEF SUMMARY

The present disclosure provides a mechanism to synchronously drive distributed speakers around a user based on localization outputs of ultra wideband (UWB) communication chips already existing in devices. Distances may be determined between a user device, such as a phone or wearable, and a plurality of distributed speakers or other devices. Based on an intersection point of such distances, the user's location can be identified. Such location can be used to modify how audio is played on each of the plurality of distributed speakers.

One aspect of the disclosure provides a user device configured to be worn or carried by a user, the user device comprising an ultra wideband sensor, a communication interface, and one or more processors in communication with the ultra wideband sensor and the communication interface. The one or more processors may be configured to detect, using the ultra wideband sensor, a distance between the user device and each of a plurality of audio playback devices, determine, based on the detected distances, a location of the user device, and communicate, using the communication interface, information to one or more of the plurality of audio playback devices for playing spatialized audio based on the determined location.

According to some examples, the determined location is a relative location with respect to the plurality of audio playback devices. The information communicated to the one or more of the plurality of audio playback devices may include the determined location of the user device, instructions for playing the spatialized audio, and/or other information.

In determining the location of the user device the one or more processors may be configured to determine a point at which relative distances between the user device and each of the plurality of audio playback devices intersect.

In determining the location of the user device the one or more processors may be configured to compute a maximum likelihood estimation based on locations of each audio playback device.

In detecting the distance between the user device and each of the plurality of audio playback devices the one or more processors may be further configured to transmit one or more signals across wide spectrum frequency to each of the plurality of audio playback devices, receive a response from each of the plurality of audio playback devices, and compute, for each response received, based on a time of the transmitting and a time of the receiving, the distance between the user device and the audio playback device.

Another aspect of the disclosure provides a method, comprising detecting, using an ultra wideband sensor, a distance between a user device and each of a plurality of audio playback devices, determining, with one or more processors based on the detected distances, a location of the user device, and communicating information to one or more of the plurality of audio playback devices for playing spatialized audio based on the determined location. The determined location may be a relative location with respect to the plurality of audio playback devices. The information communicated to the one or more of the plurality of audio playback devices may include the determined location of the user device. Communicating information to the one or more of the plurality of audio playback devices may include sending instructions for playing the spatialized audio.

According to some examples, determining the location of the user device may include determining, with one or more processors, a point at which relative distances between the user device and each of the plurality of audio playback devices intersects. According to some examples, determining the location of the user device includes computing, with one or more processors, a maximum likelihood estimation based on locations of each audio playback device. Detecting the distance between the user device and each of the plurality of audio playback devices may include transmitting one or more signals across wide spectrum frequency to each of the plurality of audio playback devices, receiving a response from each of the plurality of audio playback devices, and computing, for each response received, based on a time of the transmitting and a time of the receiving, the distance between the user device and the audio playback device.

Yet another aspect of the disclosure provides a non-transitory computer-readable medium storing instructions executable by one or more processors for performing a method of localization of a user device for audio spatialization, the method comprising detecting, using an ultra wideband sensor, a distance between a user device and each of a plurality of audio playback devices, determining, based on the detected distances, a location of the user device, and communicating information to one or more of the plurality of audio playback devices for playing spatialized audio based on the determined location.

The determined location may be a relative location with respect to the plurality of audio playback devices. The information communicated to the one or more of the plurality of audio playback devices may include the determined location of the user device. Communicating information to the one or more of the plurality of audio playback devices may include sending instructions for playing the spatialized audio.

According to some examples, determining the location of the user device may include determining a point at which relative distances between the user device and each of the plurality of audio playback devices intersects. According to some examples, determining the location of the user device includes computing a maximum likelihood estimation based on locations of each audio playback device. Detecting the distance between the user device and each of the plurality of audio playback devices may include transmitting one or more signals across wide spectrum frequency to each of the plurality of audio playback devices, receiving a response from each of the plurality of audio playback devices, and computing, for each response received, based on a time of the transmitting and a time of the receiving, the distance between the user device and the audio playback device.

DETAILED DESCRIPTION

The present disclosure provides a mechanism to synchronously drive distributed speakers around a user based on localization outputs of ultra wideband (UWB) communication chips already existing in devices. UWB chips can easily fit in a set of speakers as they are small in footprint and cheap in cost. A wearable device, such as a watch, earbud, etc. worn by the user, or a pseudo-wearable device such as a phone carried by the user also has UWB capabilities. By using robust maximum likelihood estimation (MLE) based inference, from pairwise distances that the UWB channels measure, the location of the user can be determined within a few centimeters accuracy. This information is broadcasted back to the distributed speaker set to then devise a way to modulate and isolate different parts of the audio such that the user at the particular location has a perceptually pleasing experience. Based on the user's detected location, sounds may be played back differently at each speaker, such as by adjusting volumes, adjusting the content that is played, etc. As one example, a first speaker may output dialogue or speech while a second speaker may output background music.

Figure 1:
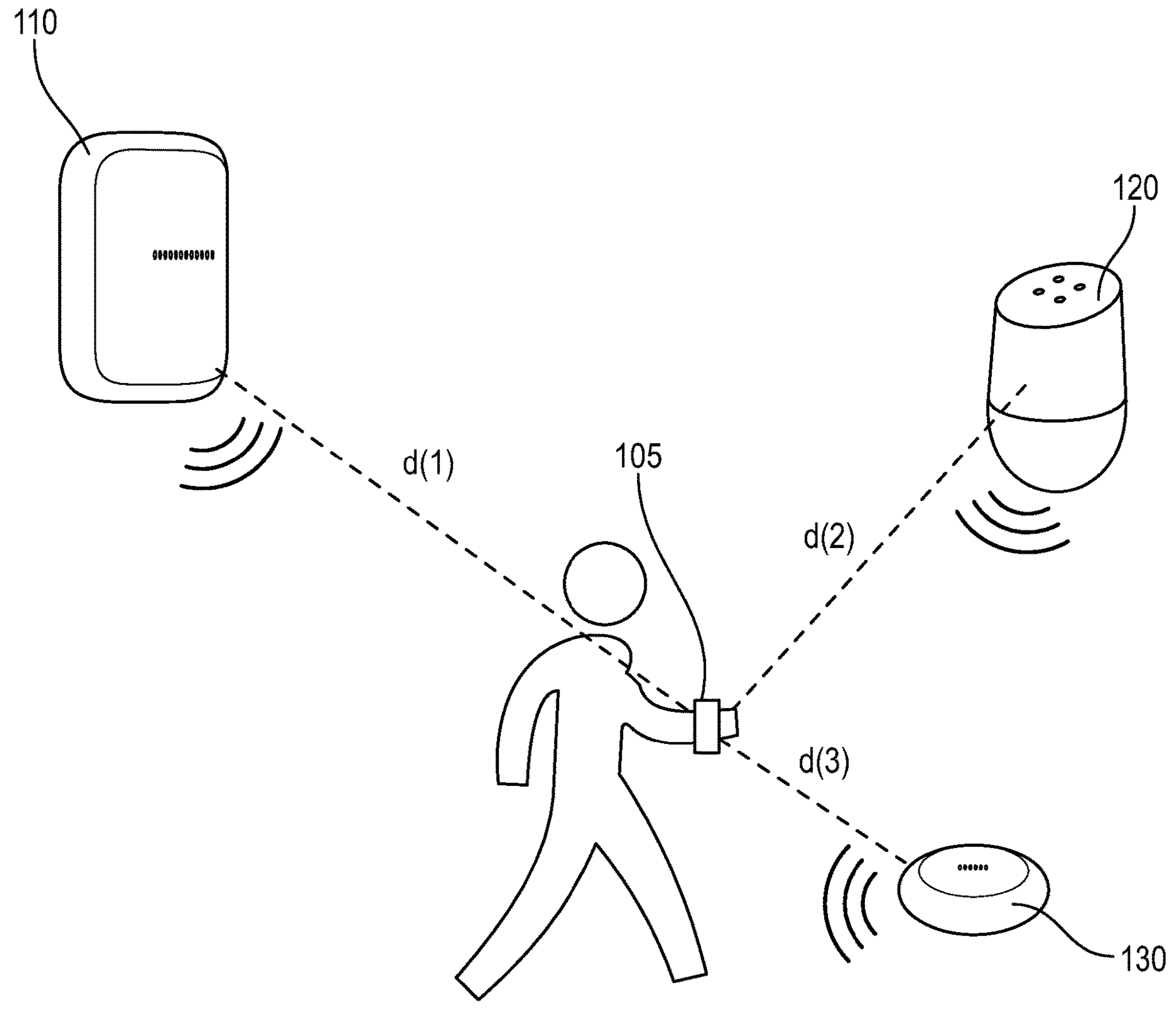
FIG. 1 is a pictorial diagram illustrating an example system according to aspects of the disclosure.

FIG. 1 illustrates an example system including a user device 105 within communication range of a plurality of audio playback devices 110, 120, 130. At least one of the user device 105 or the audio playback devices 110, 120, 130 may determine respective distances d(1), d(2), d(3) between the user device 105 and each of the plurality of audio playback devices 110, 120, 130. Such distances may be determined using UWB sensors in the user device 105 and the audio playback devices 110, 120, 130. The respective distances d(1), d(2), d(3), when considered together, may be used to determine an accurate location of the user device 105, as described further in connection with FIG. 2. The location of the user device may be expressed as a relative location with regard to the audio playback devices 110, 120, 130.

The audio playback devices 110, 120, 130 may each store data indicating a relative speaker topology. By way of example, the relative topology can be learned by each audio playback device 110, 120, 130, such as by using UWB. For example, a first device, such as the audio playback device 110, may be set as an origin point (0, 0) and locations of the other audio playback devices 120, 130 may be established relative to the origin point. For example, the first audio playback device 110 may send UWB pulses to each of the other audio playback devices 120, 130 and receive responses that can be used to determine relative distances between the audio playback devices 110, 120 and between the audio playback devices 110, 130. The other devices may do the same. The audio playback device 110 may further receive information from one of second or third audio playback devices 120, 130 indicating a relative distance between those two audio playback devices 120, 130. Using all of this information, the audio playback device 110 may be able to determine its position relative to each of the other audio playback devices 120, 130.

According to some examples, an orientation of the user, such as a direction the user is facing, may also be determined from the information. By way of example, if one audio playback device 110, 120, 130 includes a display depicting visual content relative to the audio content being played, such as a movie corresponding to sound output through the audio devices, it may be inferred that the user is facing the display. According to some examples, the distance detection and location determination may be periodically or continuously updated to account for movement of the user.

Where the location is determined by a given device, such as the user device 105, the determined location may be communicated from that device to the other devices, such as the audio playback devices 110, 120, 130. Such communication may be performed over any type of short range wireless pairing, local area network, or other connection. By way of example only, the user device 105 may broadcast the determined location to the audio playback devices 110, 120, 130 over a wireless pairing connection, such as Bluetooth. In other examples, the location may be sent to a controller device that relays it to further devices. In further examples, determination of the location may be performed by any of the audio playback devices 110, 120, 130 or by a separate controller device, or by any combination of the devices operating in parallel.

The determined location may be used to determine how each of the audio playback devices 110, 120, 130 should output sound to provide a spatialized audio experience for the user. For example, each speaker may play a sound that is spatially-dependent amplitude-modulated and thus for the user, it feels like the audio is streaming ambiently throughout space, not from a specific point. Such spatially-dependent amplitude modulated sound changes an amount of modulation per sound channel based on the determined location of the user. The output may similarly be phase modulated. According to some examples, the devices may output audio at different relative volumes, output different content, etc. By way of example only, devices that are closer to the user may output audio at a different volume than playback devices that are further away. As another example, the devices that are behind the user may output different content, such as background music, while devices in front of the user output speech or dialogue. In this example, the user's orientation may be determined using one or more sensors in the user device 105. For example, a magnetometer or compass may supply information that can be matched with information from the audio playback devices to infer a relative orientation of the user. As another example, speaker-to-user UWB angles may be analyzed, such as described further below in connection with FIG. 3B.

The user device 105 may be a wearable device, such as a watch, earbuds, smartglasses, pendant, smart clothing, augmented reality or virtual reality headset, or any other types of electronic device adapted to be worn by a user. According to other examples, the user device may be a semi-wearable device, such as a mobile phone, laptop, portable gaming console, or other device that may be held by the user, carried in the user's pocket, or the like. According to further examples, the user device 105 may be a collection of devices in communication with one another. By way of example only, a phone plus a wearable device may operate together as the user device 105.

The audio playback devices 110, 120, 130 may be, for example, speakers, smart home devices such as hubs, assistants, or the like, or any other device capable of emitting sound. Each of the audio playback devices 110, 120, 130 may include UWB capabilities, such that the user device 105 can detect the audio playback devices 110, 120, 130 and/or the audio playback devices 110, 120, 130 can detect the user device 105. While three audio playback devices 110, 120, 130 are illustrated in the present example, it should be understood that any number of playback devices may be used. For example, two, four, or any number of additional devices may be used.

Figure 2:
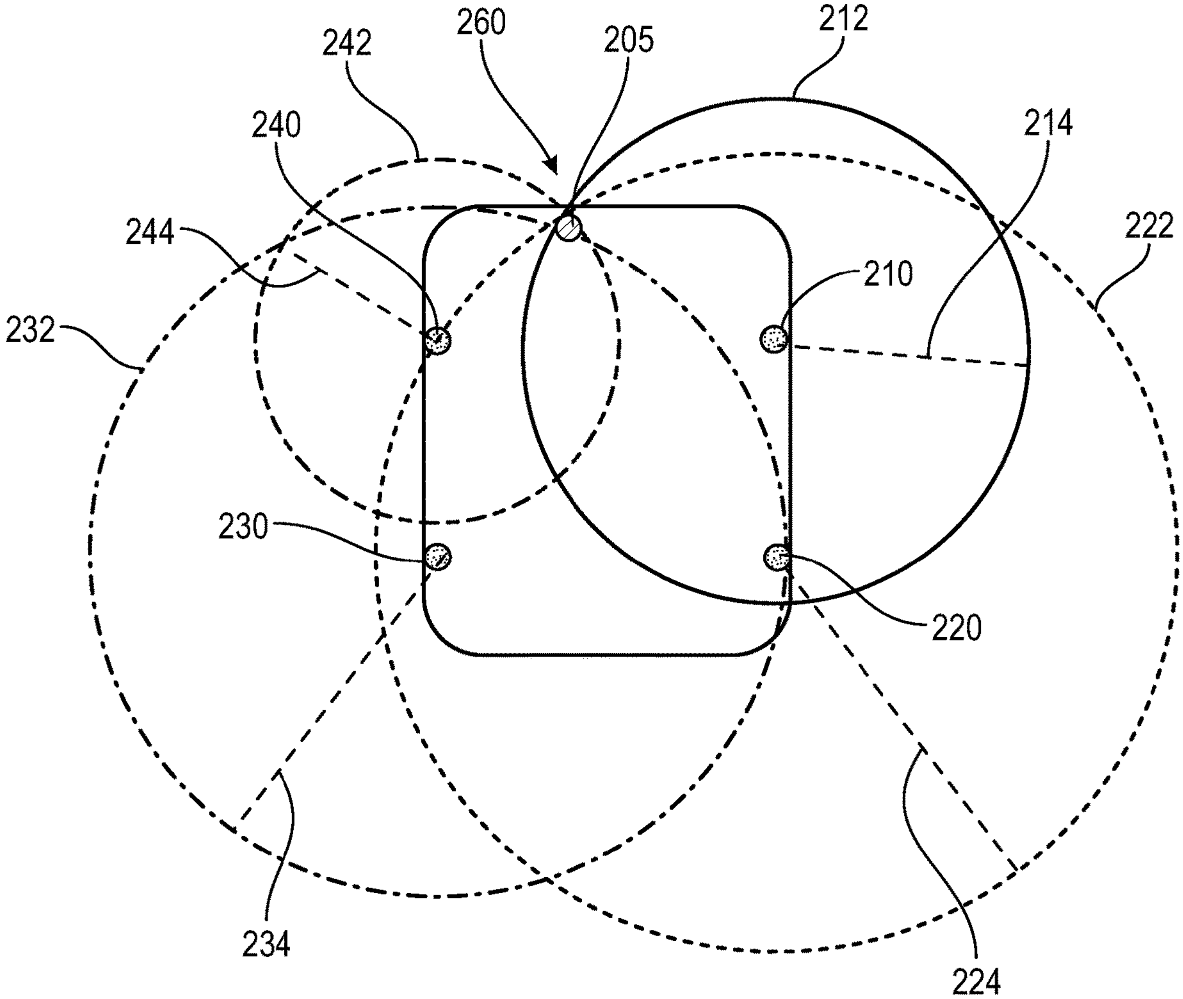
FIG. 2 is a relational diagram illustrating detection of user location based on relative distance measurements according to aspects of the disclosure.

FIG. 2 illustrates an example of determining the location of a user device 205 based on UWB readings from pairing between the user device 205 and each of a plurality of audio playback devices 210, 220, 230, 240. Each user device-playback device pair can produce a measurement, using embedded UWB devices, the measurement indicating the distance between the two devices defining the pair. For N pairs of devices, with the user device 205 being the anchor, N distance measurements can be produced.

The distances between the user device 205 and each audio playback device 210, 220, 230, 240 are represented by circles 212, 222, 232, 242 having respective radii 214, 224, 234, 244. The radius 214, 224, 234, 244 of each circle 212, 222, 232, 242 corresponds to the measured distance between the audio playback device and the user device 205. Because UWB may measure distance but not direction, a distance can be measured in any direction around each playback device 210, 220, 230, 240 and therefore the circles 212, 222, 232, 242 represent all possible positions of the user device 205 with respect to each audio playback device 210, 220, 230, 240. The actual location of the user device 205 is at an intersection 260 of all the circles 212, 222, 232, 242.

In practice, distance measurements may be noisy. For example, noise may be caused by objects in a path between the user device 205 and playback device, other nearby electronics, or the like. In such instances where measurements are noisy, a common intersection point may not exist. To find the most likely common intersection point given noise, a maximum-likelihood estimation (MLE) approach may be used. This assumes that the time-of-flight (ToF) values for signals transmitted between the user device and the audio devices across a wide frequency spectrum are corrupted with additive Gaussian noise.

$$\text{maximize } v\sum_{k=1}^{N} L(v; v_k, c\cdot t_k/2)$$

$$\mathcal{L}(v; v_k, c\cdot t_k/2) = \exp\{(\|v - v_k\|_2 - c\cdot t_k/2)^2/(2\cdot\sigma^2)\}$$

In this equation, v represents coordinates to be determined of the user device, $v_k$ represents coordinates of a given audio playback device k, c is the speed of light, and $t_k$ is an estimated time between sending a UWB signal from the user device 105 to the given audio playback device k and receiving a response at the user device 105 from the given audio playback device k. Variable k is an index indicating a number of audio playback devices. For example, k=1, 2, 3, . . . N to indicate a number of audio playback devices up to N audio playback devices. σ is a tunable parameter that describes noise levels of time delay observations. For example, a can be an inverse of received signal strength indication (RSSI) values associated with the UWB measurements.

The recovery algorithm is basically solving an optimization problem that maximizes the likelihood function over the coordinate parameters given the pairwise distance data. Once a reasonable localization result for the user is determined, the result may be broadcast back to the plurality of speakers to perform their respective modulation. According to some examples, such broadcasting can be done over local networks, such as Bluetooth low energy (BLE), and IP-based mesh network, Wi-Fi, etc.

Figure 3A:
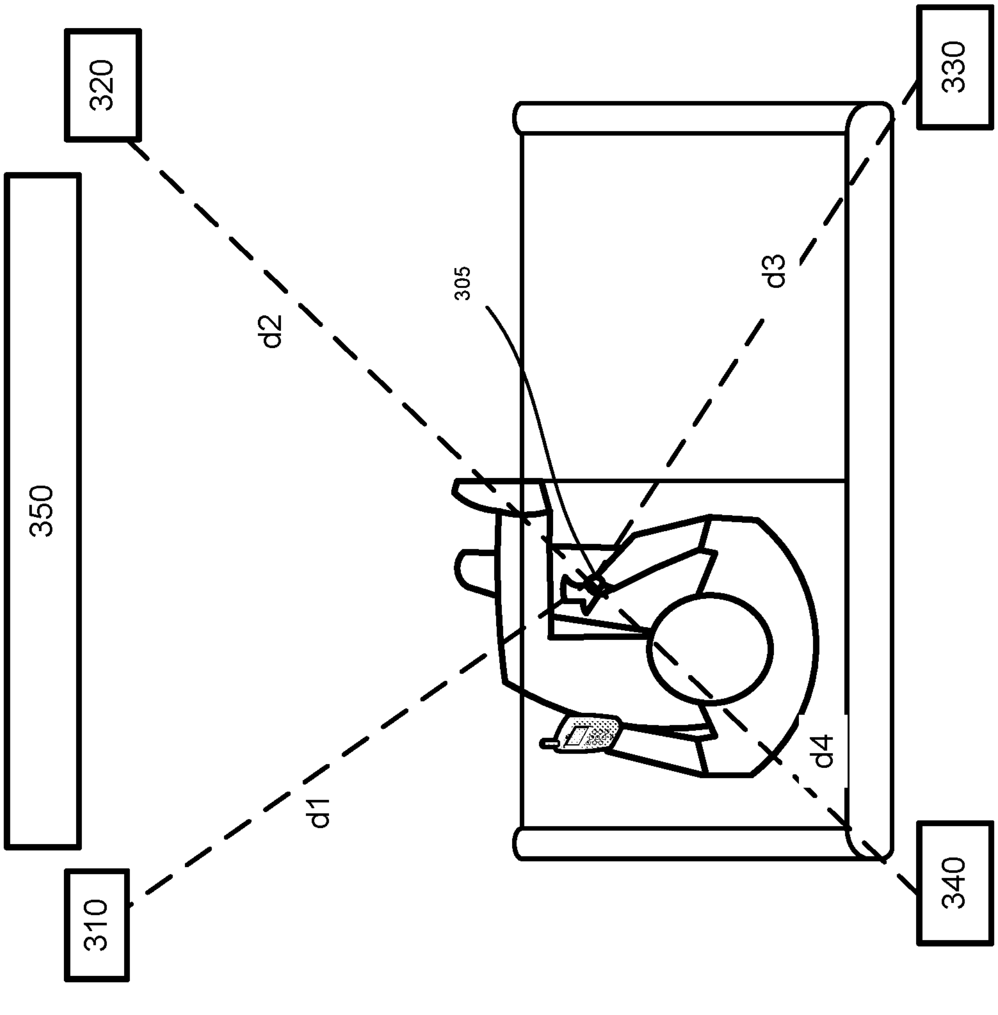
FIG. 3A is a pictorial diagram illustrating an example localization according to aspects of the disclosure.

FIG. 3A illustrates an example of localization using UWB. Audio playback devices 310, 320, 330, 340 are positioned around a seating area occupied by a user. In the particular example shown, audio playback devices 310, 320 are positioned on either side of a display 350, and audio playback devices 330, 340 are positioned behind the seating area. The audio playback devices 310, 320, 330, 340 may self-determine their relative topology through communications amongst the audio playback devices 310, 320, 330, 340. For example, each audio playback device can use UWB to detect its location relative to other devices. The detected distances may be shared among all audio playback devices. For example, the audio playback device 310 may receive information indicating a distance between the playback device 320 and the playback device 340. Such information may be used to determine the relative topology, such as by using triangulation techniques. The relative topology may also include display 350. For example, the audio playback devices 310, 320, 330, 340 may each detect their distance relative to the display 350.

User device 305, shown here as a watch worn by the user, can detect relative distances d1, d2, d3, d4 between the user device and each audio playback device 310, 320, 330, 340 using UWB. These relative distances may be used to calculate the position of the user. According to some examples, it may be inferred that if the user has a relative location that is generally inside a perimeter set by the audio playback devices 110, 120, 130, 140, then the user is facing the display 350. According to other examples, additional sensors may be used to determine the user's orientation.

Figure 3B:
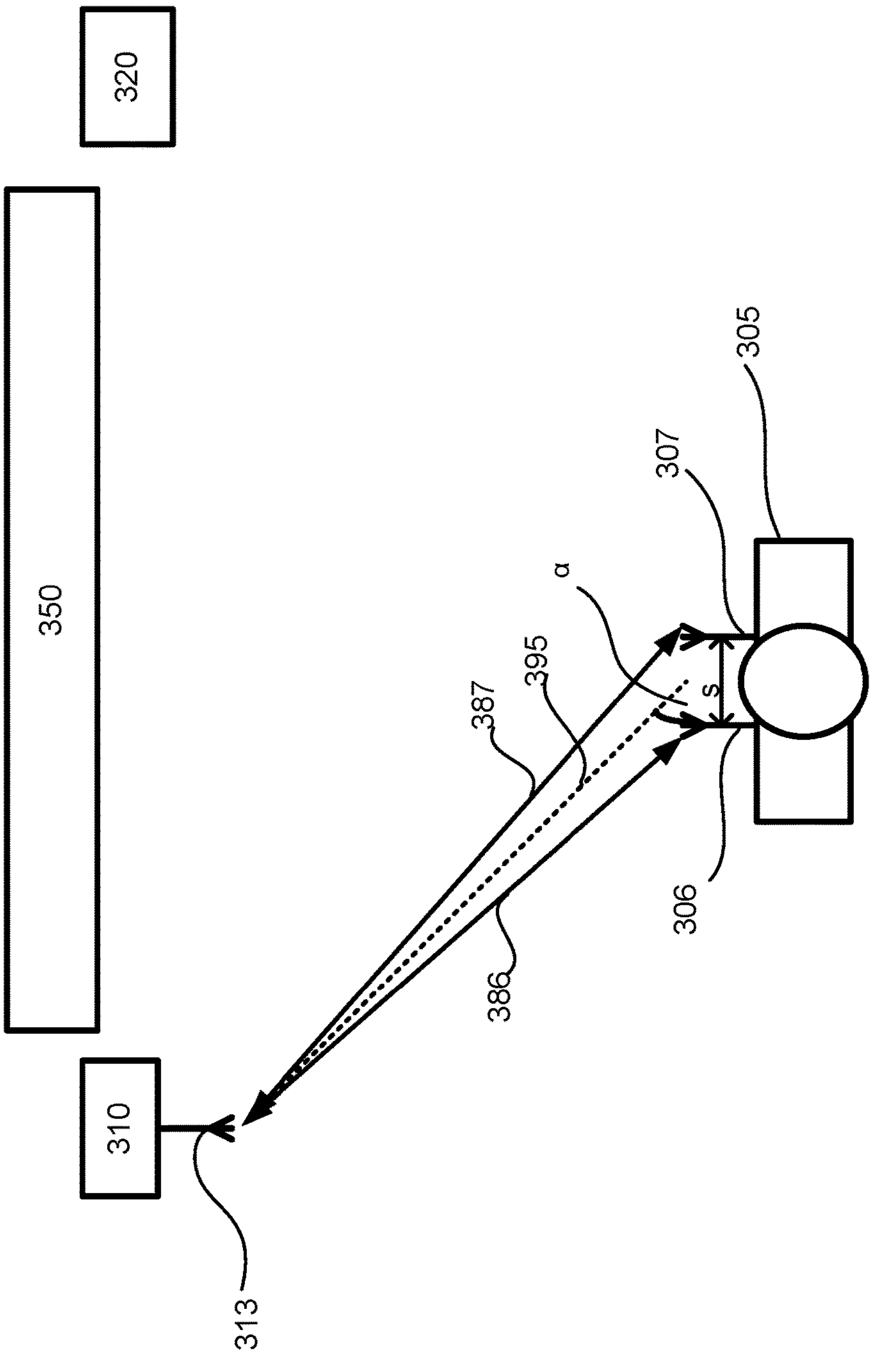
FIG. 3B is a pictorial diagram illustrating an example angle determination according to aspects of the disclosure.

FIG. 3B illustrates an example determination of an angle of the user device 305 with respect to one or more of the audio playback devices. As shown in this example, audio playback device 310 includes at least a first antenna 313 and user device 305 includes a first antenna 306 and a second antenna 307 separated by distance s. Each of the antennas 306, 307 of the user device 305 may send UWB signals to the antenna 313 and receive a response, as indicated by arrows 386, 387. Using a reference line 395 between the signals 386, 387, angle α may be calculated as the angle of arrival of the signals at the user device 305. While the angle α is illustrated with respect to audio playback device 310 for simplification, angles with respect to each other device may similarly be determined.

Figure 3C:
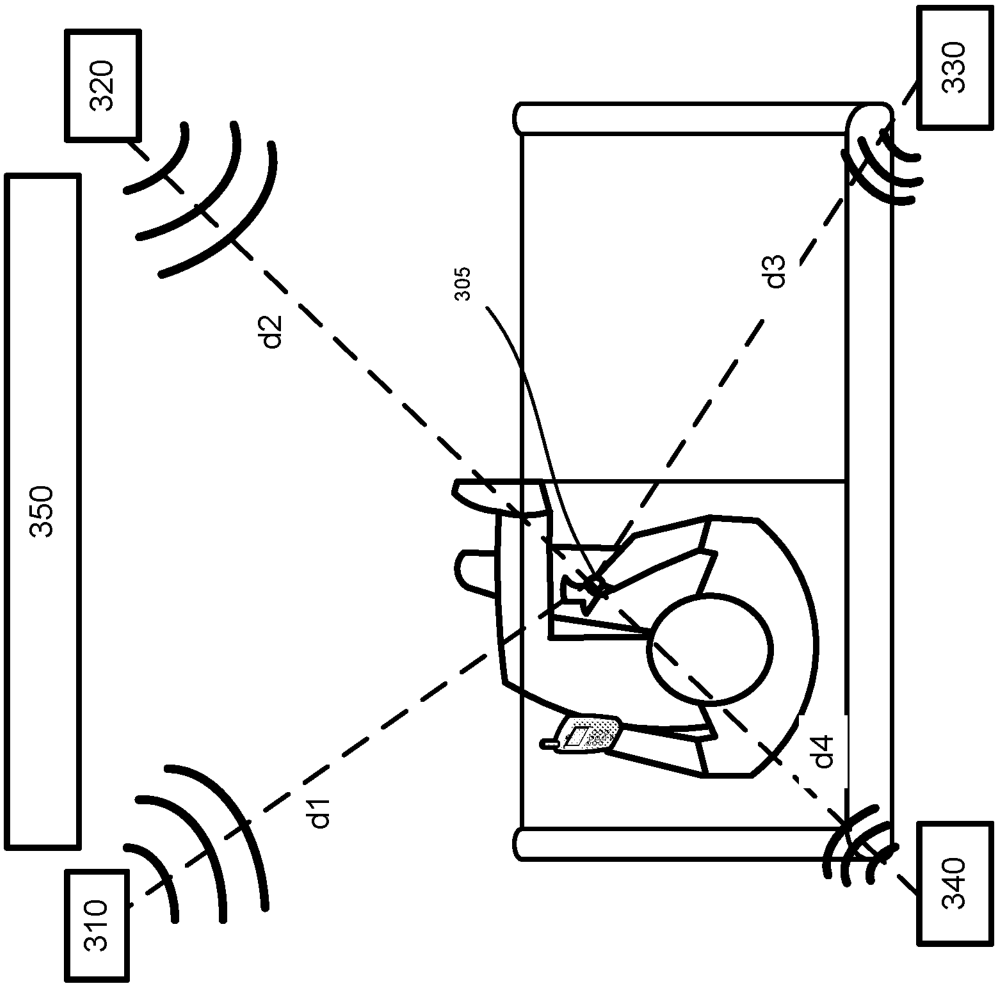
FIG. 3C is a pictorial diagram illustrating an example audio spatialization technique according to aspects of the disclosure.
Figure 4B:
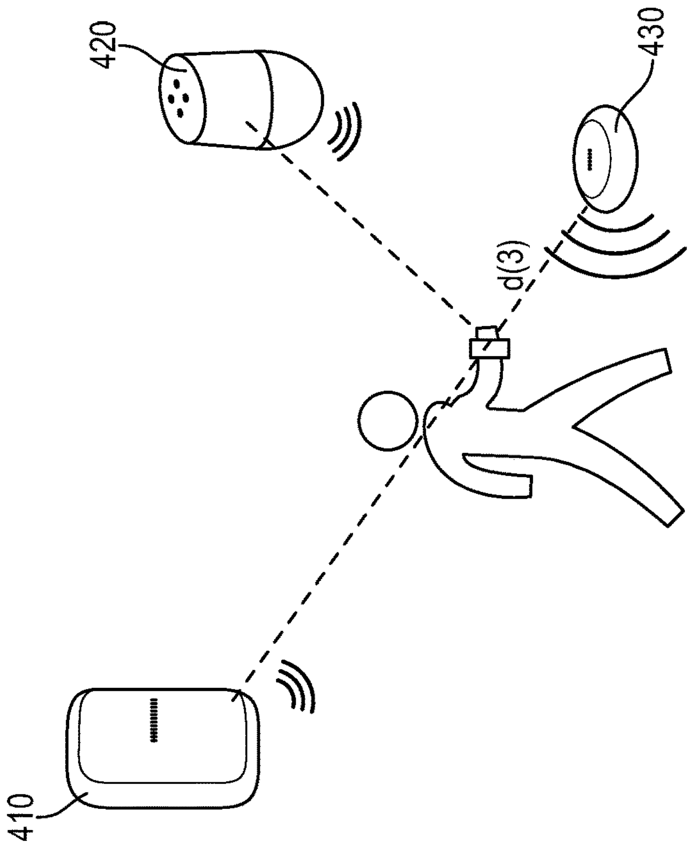
FIGS. 4A-4B are pictorial diagrams illustrating other example audio spatialization techniques according to aspects of the disclosure.
Figure 4A:
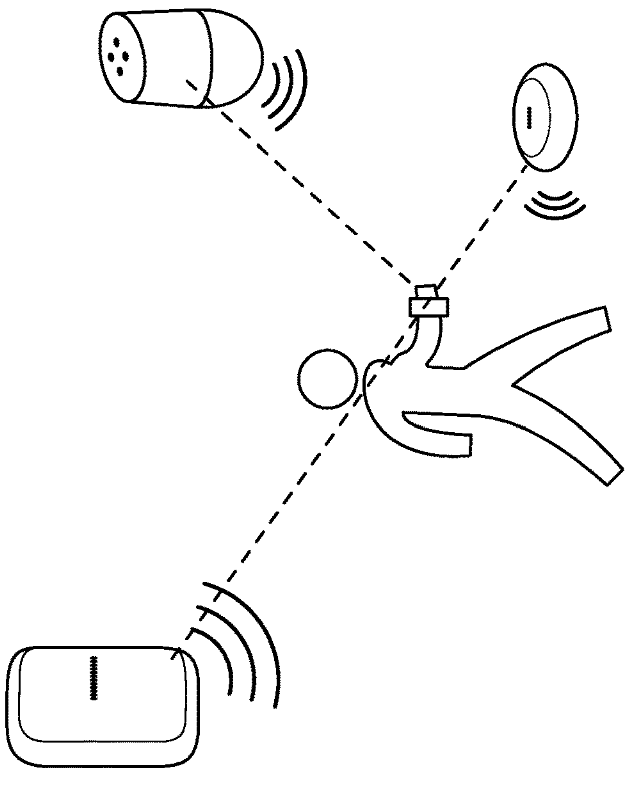

FIGS. 3C and 4A-4B illustrate example programs that the audio playback speakers can implement to provide the user with a perceptually pleasing spatial audio experience. FIG. 3C illustrates an example of spatial audio, such as surround sound. Based on the determined relative location of the user device 305, sound may be emitted from the audio playback devices 310, 320, 330, 340 to provide a spatialized experience. For example, the devices may collectively generate a 3D audio experience.

FIG. 4A illustrates an example of uniform equalization. According to this example, the audio content is modulated in a way where the speaker amplitude is proportional to the distance between that speaker and the user. For the user, this will have the effect of audio playing in the whole room, rather than at a fixed point. Also, this can adapt to the user moving as the modulation strategy can change over time. As the user travels in space, the audio experience will be a consistent spatial, whole-room audio.

FIG. 4B illustrates another equalization method that is based on proximity. In this example, the audio has the effect of "following" the user wherever they go. The audio strength will be inversely proportional to the distance. For example, device 430, which is closer to the user than devices 410, 420, may emit sound louder than the devices 410, 420 emit sound. If the user moves to a different location that is closer to the device 410, for example, the audio emitted by the devices will transition such that the device 410 becomes louder and the device 430 becomes quieter. In some instances, where audio playback devices are in different rooms in a house, this can give the effect of the audio following the user as the user travels from room to room. Because user intervention is not required, the user experience is seamless.

Figure 5:
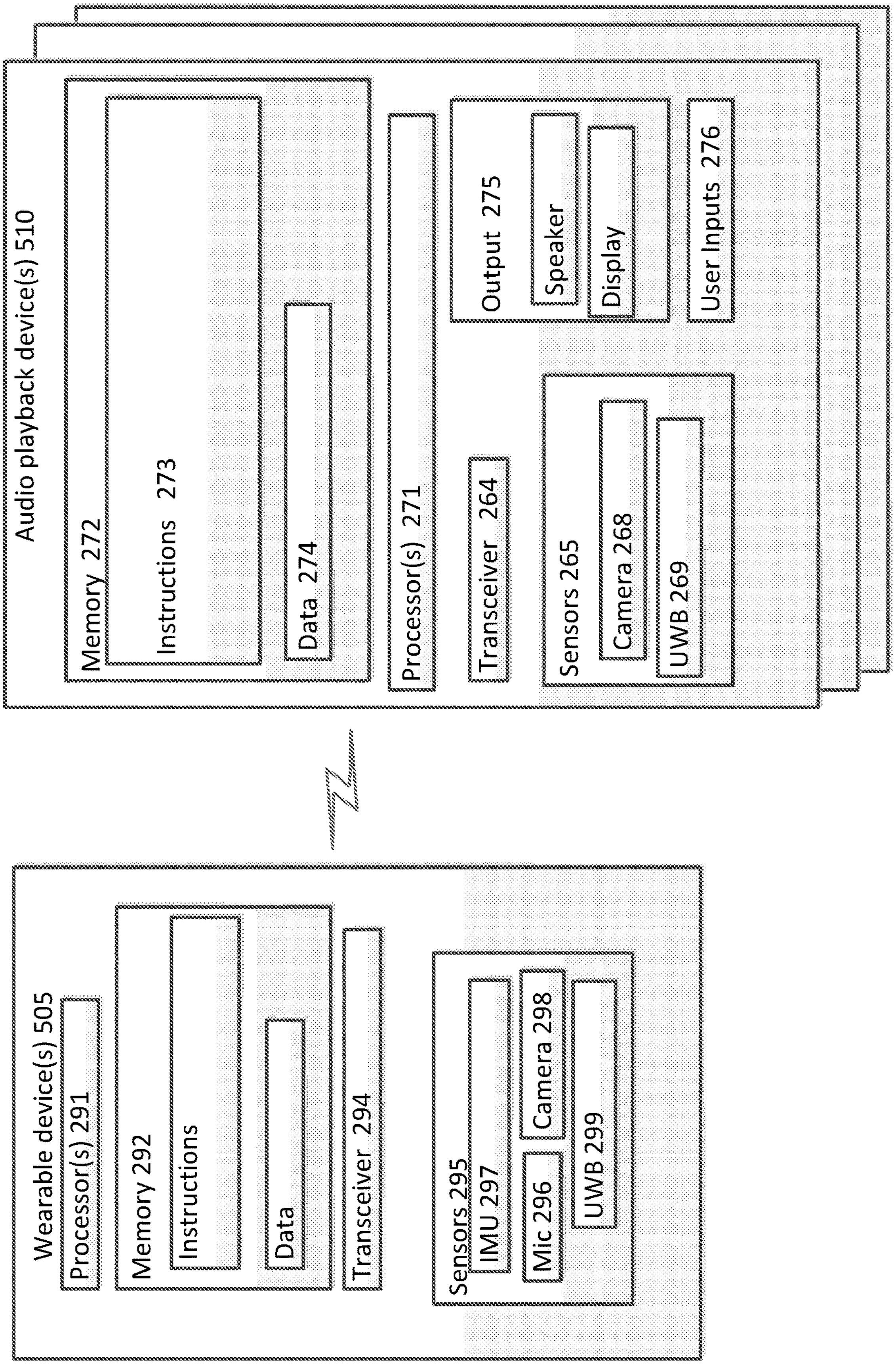
FIG. 5 is a block diagram illustrating an example system according to aspects of the disclosure.

FIG. 5 further illustrates example computing devices in the system, and features and components thereof. While the example illustrates one wearable device in communication with a plurality of audio playback devices, additional wearable and/or playback devices may be included. According to some examples, processing of signals, determination of location, and generation of instructions for audio playback may be performed at a single device, such as the wearable device 505 or the playback device 510. According to other examples, processing may be performed by different processors in the different devices in parallel, and combined at one or more devices.

The wearable device 505 includes various components, such as a processor 291, memory 292 including data and instructions, transceiver 294, sensors 295, and other components typically present in wearable wireless computing devices. The wearable device 505 may have all of the components normally used in connection with a wearable computing device such as a processor, memory (e.g., RAM and internal hard drives) storing data and instructions, user input, and output.

The wearable device 505 may also be equipped with short range wireless pairing technology, such as a Bluetooth transceiver, allowing for wireless coupling with other devices. For example, transceiver 294 may include an antenna, transmitter, and receiver that allows for wireless coupling with another device. The wireless coupling may be established using any of a variety of techniques, such as Bluetooth, Bluetooth low energy (BLE), ultra wide band (UWB), etc.

The sensors 295 may be capable of detecting relative proximity of the wearable device 505 to the audio playback devices 510, etc. The sensors may include, for example, UWB sensor 299. According to some examples, the sensors 295 may further include other types of sensors, such as for detecting movement of the wearable device 505. Such additional sensors may include IMU sensors 297, such as an accelerometer, gyroscope, etc. For example, the gyroscopes may detect inertial positions of the wearable device 505, while the accelerometers detect linear movements of the wearable device 505. Such sensors may detect direction, speed, and/or other parameters of the movements. The sensors may additionally or alternatively include any other type of sensors capable of detecting changes in received data, where such changes may be correlated with user movements. For example, the sensors may include a barometer, motion sensor, temperature sensor, a magnetometer, a pedometer, a global positioning system (GPS), proximity sensor, strain gauge, camera 298, microphone 296, etc. The one or more sensors of each device may operate independently or in concert.

The UWB sensor 299 or other proximity sensor may be used to determine a relative position, such as angle and/or distance, between two or more devices. Such information may be used to detect a relative position of devices, and therefore detect a relative position of the user with respect to the audio playback devices 510.

The audio playback devices 510 may include components similar to those described above with respect to the wearable device. For example, the audio playback devices 510 may each include a processor 271, memory 272, transceiver 264, and sensors 265. Such sensors may include, without limitation, UWB sensor 269, one or more cameras 268 or other image capture devices, such as thermal recognition, etc.

The sensors 265 may be used to determine relative position of the audio playback devices 510 with the wearable device 505. For example, using UWB sensor 269, a relative distance between the devices may be determined. When the relative distances of each of the audio playback devices 510 is analyzed together, the location of the wearable device 505 may be determined.

According to some examples, additional sensors may be used to further improve an accuracy of the determined location of the wearable device 505. By way of example, the camera 268 may capture images of the user, provided that the user has enabled the camera and configured the camera to receive input for use in association with other devices in detecting location.

Input 276 and output 275 may be used to receive information from a user and provide information to the user. The input may include, for example, one or more touch sensitive inputs, a microphone, sensors, etc. Moreover, the input 276 may include an interface for receiving data from the wearable device 505 and/or other wearable devices or other audio playback devices. The output 275 may include, for example, a speaker, display, haptic feedback, etc.

The one or more processors 271 may be any conventional processors, such as commercially available microprocessors. Alternatively, the one or more processors may be a dedicated device such as an application specific integrated circuit (ASIC) or other hardware-based processor. Although FIG. 5 functionally illustrates the processor, memory, and other elements of the smart home device 160 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of audio playback devices 510. Accordingly, references to a processor or computing device will be understood to include references to a collection of processors or computing devices or memories that may or may not operate in parallel.

Memory 272 may store information that is accessible by the processors 271, including instructions 273 that may be executed by the processors 271, and data 274. The memory 272 may be of a type of memory operative to store information accessible by the processors 271, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 273 and data 274 are stored on different types of media.

Data 274 may be retrieved, stored or modified by processors 271 in accordance with the instructions 273. For instance, although the present disclosure is not limited by a particular data structure, the data 274 may be stored in computer registers, in a relational database as a table having a plurality of different fields and records, XML documents, or flat files. The data 274 may also be formatted in a computer-readable format such as, but not limited to, binary values, ASCII or Unicode. By further way of example only, the data 274 may be stored as bitmaps comprised of pixels that are stored in compressed or uncompressed, or various image formats (e.g., JPEG), vector-based formats (e.g., SVG) or computer instructions for drawing graphics. Moreover, the data 274 may comprise information sufficient to identify the relevant information, such as numbers, descriptive text, proprietary codes, pointers, references to data stored in other memories (including other network locations) or information that is used by a function to calculate the relevant data.

While the processor 271 and memory 272 of the audio playback devices 510 are described in detail, it should be understood that the processor 291 and memory 292 of the wearable device 100 may include similar structure, features, and functions. In addition, the instructions of the wearable device may be executed by the processor 291 to detect the relative location of the wearable device 505 relative to the audio playback devices 510. Such location information may be communicated by the wearable device 505 to the audio playback devices 510, such as over a short-range wireless pairing, wireless local area network, or other type of connection.

Figure 6:
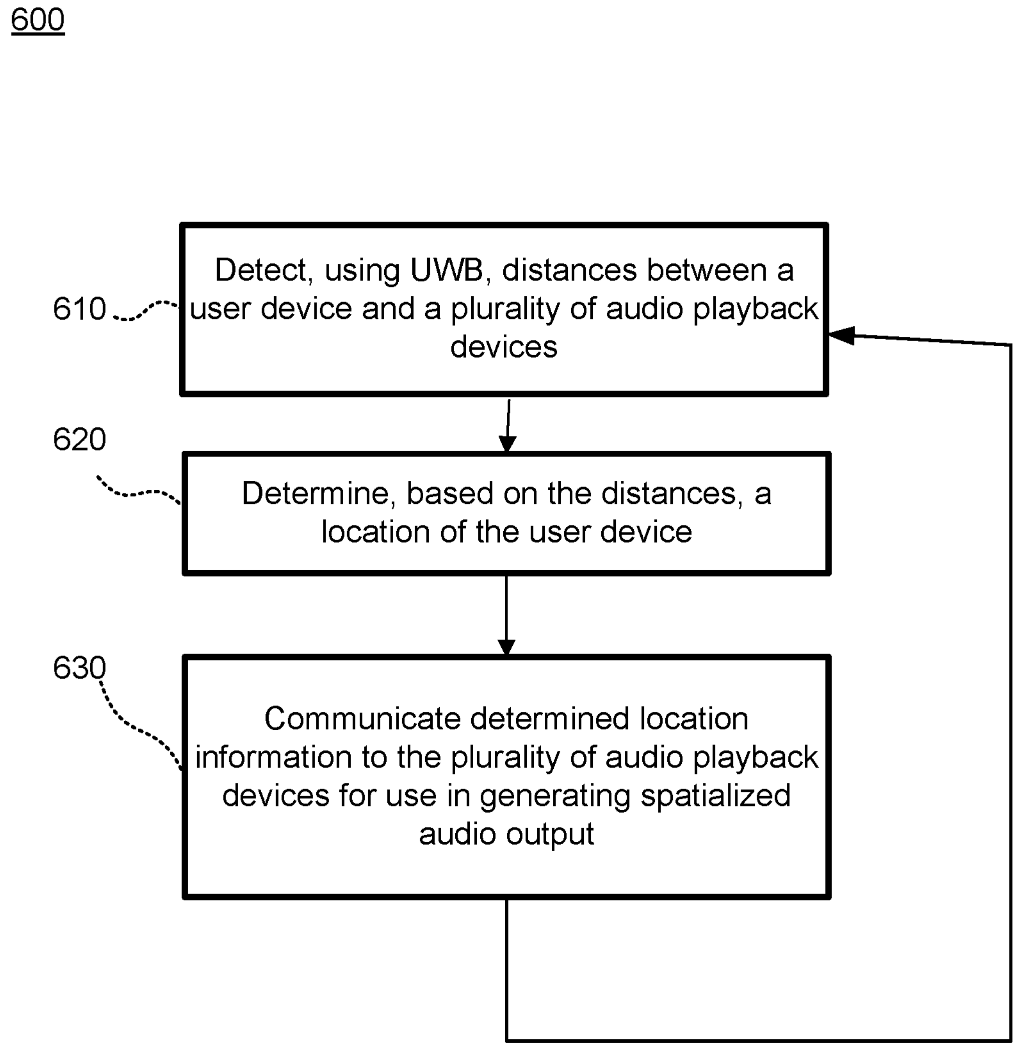
FIG. 6 is a flow diagram illustrating an example method according to aspects of the disclosure.

FIG. 6 is a flow diagram illustrating an example method 600 of using UWB to determine user location based on a relative location of the user device to a plurality of audio plackback devices, and outputting spatialized audio based on the determined location. The method 600 may be performed by the user device, one or more of the audio playback devices, a separate controller device, or any combination of such devices. The user device may be a smartwatch or other wearable electronic device, such as a fitness tracker, gloves, ring, wristband, headset, earbuds, etc. with integrated electronics, or other portable device carried by the user, such as a phone, laptop, portable gaming system, etc. While the operations are illustrated and described in a particular order, it should be understood that the order may be modified and that operations may be added or omitted.

In block 610, distances between the user device and each of the audio playback devices are determined using UWB. For example, a transmitter in the user device sends one or more signals to the audio playback devices across a wide frequency spectrum and receives a reply from each audio playback device. Each reply may be accompanied by information identifying the audio playback device that sent the reply, such as an identifier, location coordinates of the audio playback device, etc. Based on a time between transmission of the one or more signals and receipt of the reply, the user device may determine a relative distance between the user device and the audio playback device. According to some examples, the user device may further determine an angle between the user device and the audio playback device based on the UWB.

In block 620, a location of the user device is determined based on the detected distances between the user and each audio playback device. According to one example, the location may be determined by finding an intersection point of a plurality of circles, each circle having a center corresponding to a location of an audio playback device and a radius corresponding to the detected distance between the user device and that audio playback device. The intersection point may correspond to the location of the user device. According to another example, the location of the user device may be determined using a maximum likelihood estimation. According to this approach, the location of the user device may be computed using coordinates of the audio playback devices, the detected distances between the devices, the speed of light, and an estimated time delay.

In block 630, the determined location information is communicated to each of the plurality of audio playback devices for use in generating spatialized audio output. For example, the location information may be broadcast from the user device to the plurality of audio playback devices, such as over a short-range wireless pairing connection, local area network connection, or other connection. In other examples, the location information may be communicated to one device and relayed to the other devices.

According to some examples, the user device may also send instructions to each audio playback device for outputting spatialized audio. For example, the user device may receive a selection from the user of a type of spatialized audio output. Such types of spatialized audio may include, for example, uniform equalization or proximity equalization, as discussed above in connection with FIGS. 3 and 4, respectively. Other examples of spatialization include playing different content from different playback devices. For example, background music or ambient sounds may be played from one device while speech or dialogue of characters is played from another.

In other examples, the audio playback devices may use the received location information to determine how to output spatialized audio. For example, each audio playback device may be programmed to determine, based on the received location information, what content to output and at what volume. In some examples, one of the audio playback devices may operate as a controller having knowledge of each audio playback device's position and relative location to the user device, and providing instructions to the other audio playback devices. In further examples, each audio playback device may have knowledge of the other audio playback devices' relative locations to the user. For example, the relative topology of the audio playback devices can be learned by each audio playback device, such as by using UWB. A first device may be set as an origin point (0, 0) and locations of the other audio playback devices may be established relative to the origin point. For example, the first audio playback device may send UWB pulses to each of the other audio playback devices and receive responses that can be used to determine relative distances between the audio playback devices. The other devices may do the same. Using such information, the relative location of each audio playback device may be derived.

The location detection may be updated, for example, periodically or continually. Accordingly, as the user moves about, the spatialized audio output may be adjusted to accommodate the user's updated location.

The foregoing techniques are advantageous in that they provide for an improved listening experience without costly dedicated devices, cumbersome setup, or the like.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A user device configured to be worn or carried by a user, the user device comprising:

an ultra wideband sensor;

a communication interface; and one or more processors in communication with the ultra wideband sensor and the communication interface, the one or more processors configured to:

detect, using the ultra wideband sensor, a distance between the user device and each of a plurality of audio playback devices;

determine, based on the detected distances, a location of the user device, the determination of the location of the user device comprising determining a point at which relative distances between the user device and each of the plurality of audio playback devices intersect; and communicate, using the communication interface, information to one or more of the plurality of audio playback devices for playing spatialized audio based on the determined location.

2. The user device of claim 1, wherein the determined location is a relative location with respect to the plurality of audio playback devices.

3. The user device of claim 1, wherein the information communicated to the one or more of the plurality of audio playback devices comprises the determined location of the user device.

4. The user device of claim 1, wherein the information communication to the one or more of the plurality of audio playback devices comprises instructions for playing the spatialized audio.

5. The user device of claim 1, wherein in determining the location of the user device the one or more processors are configured to compute a maximum likelihood estimation based on locations of each audio playback device.

6. The user device of claim 1, wherein in detecting the distance between the user device and each of the plurality of audio playback devices the one or more processors are further configured to:

transmit one or more signals across wide spectrum frequency to each of the plurality of audio playback devices;

receive a response from each of the plurality of audio playback devices; and compute, for each response received, based on a time of the transmitting and a time of the receiving, the distance between the user device and the audio playback device.

7. A method, comprising:

detecting, using an ultra wideband sensor, a distance between a user device and each of a plurality of audio playback devices;

determining, with one or more processors based on the detected distances, a location of the user device, the determination of the location of the user device comprising determining a point at which relative distances between the user device and each of the plurality of audio playback devices intersects; and communicating information to one or more of the plurality of audio playback devices for playing spatialized audio based on the determined location.

8. The method of claim 7, wherein the determined location is a relative location with respect to the plurality of audio playback devices.

9. The method of claim 7, wherein the information communicated to the one or more of the plurality of audio playback devices comprises the determined location of the user device.

10. The method of claim 7, wherein communicating information to the one or more of the plurality of audio playback devices comprises sending instructions for playing the spatialized audio.

11. The method of claim 7, wherein determining the location of the user device comprises computing, with one or more processors, a maximum likelihood estimation based on locations of each audio playback device.

12. The method of claim 7, wherein detecting the distance between the user device and each of the plurality of audio playback devices further comprises:

transmitting one or more signals across wide spectrum frequency to each of the plurality of audio playback devices;

receiving a response from each of the plurality of audio playback devices; and computing, for each response received, based on a time of the transmitting and a time of the receiving, the distance between the user device and the audio playback device.

13. A non-transitory computer-readable medium storing instructions executable by one or more processors for performing a method of localization of a user device for audio spatialization, the method comprising:

detecting, using an ultra wideband sensor, a distance between a user device and each of a plurality of audio playback devices;

determining, based on the detected distances, a location of the user device, the determining of the location of the user device comprising determining a point at which relative distances between the user device and each of the plurality of audio playback devices intersects; and communicating information to one or more of the plurality of audio playback devices for playing spatialized audio based on the determined location.

14. The non-transitory computer-readable medium of claim 13, wherein the determined location is a relative location with respect to the plurality of audio playback devices.

15. The non-transitory computer-readable medium of claim 13, wherein the information communicated to the one or more of the plurality of audio playback devices comprises the determined location of the user device.

16. The non-transitory computer-readable medium of claim 13, wherein communicating information to the one or more of the plurality of audio playback devices comprises sending instructions for playing the spatialized audio.

17. The non-transitory computer-readable medium of claim 13, wherein determining the location of the user device comprises determining, with one or more processors, a point at which relative distances between the user device and each of the plurality of audio playback devices intersects.

18. The non-transitory computer-readable medium of claim 13, wherein determining the location of the user device comprises computing, with one or more processors, a maximum likelihood estimation based on locations of each audio playback device.

19. The user device of claim 1, wherein the point at which relative distances between the user device and each of the plurality of audio playback devices intersect is an estimated point at which relative distances between the user device and each of the plurality of audio playback devices intersect.

20. The method of claim 7, wherein the point at which relative distances between the user device and each of the plurality of audio playback devices intersect is an estimated point at which relative distances between the user device and each of the plurality of audio playback devices intersect.

* * * * *